(12) United States Patent
Richardson

(10) Patent No.: US 9,053,842 B2
(45) Date of Patent: Jun. 9, 2015

(54) STRAY VOLTAGE INSULATING DEVICE

(71) Applicant: Paul A. Richardson, White Plains, NY (US)

(72) Inventor: Paul A. Richardson, White Plains, NY (US)

(73) Assignee: CONSOLIDATED EDISON COMPANY OF NEW YORK, INC., New York, NY (US)

(*) Notice: Subject to any disclaimer, the term of this patent is extended or adjusted under 35 U.S.C. 154(b) by 236 days.

(21) Appl. No.: 13/731,178

(22) Filed: Dec. 31, 2012

(65) Prior Publication Data

US 2013/0168130 A1    Jul. 4, 2013

Related U.S. Application Data

(60) Provisional application No. 61/582,972, filed on Jan. 4, 2012.

(51) Int. Cl.
| | |
|---|---|
| *H01B 3/06* | (2006.01) |
| *H01B 17/16* | (2006.01) |
| *H02B 3/00* | (2006.01) |
| *H02G 13/00* | (2006.01) |

(52) U.S. Cl.
CPC ........... *H01B 17/16* (2013.01); *Y10T 29/49227* (2013.01); *H02B 3/00* (2013.01); *H02G 13/00* (2013.01)

(58) Field of Classification Search
None
See application file for complete search history.

(56) References Cited

U.S. PATENT DOCUMENTS

| | | | |
|---|---|---|---|
| 6,209,768 B1 * | 4/2001 | Boaz | 224/314 |
| 7,248,054 B2 | 7/2007 | Kalokitis et al. | |
| 7,253,642 B2 | 8/2007 | Kalokitis et al. | |
| 7,486,081 B2 | 2/2009 | Kalokitis et al. | |
| 7,947,899 B2 * | 5/2011 | Jackson, III | 174/5 SB |
| 8,482,273 B2 | 7/2013 | Kalokitis et al. | |
| 8,482,274 B2 | 7/2013 | Kalokitis et al. | |
| 8,536,856 B2 | 9/2013 | Kalokitis et al. | |
| 8,577,631 B2 | 11/2013 | Kalokitis | |
| 8,598,864 B2 | 12/2013 | Kalokitis et al. | |
| 2005/0102925 A1 * | 5/2005 | Boyd | 52/155 |
| 2011/0056170 A1 * | 3/2011 | Lowe | 52/835 |
| 2012/0318686 A1 * | 12/2012 | Koniers | 206/216 |

* cited by examiner

*Primary Examiner* — Tuan T Dinh
*Assistant Examiner* — Steven T Sawyer
(74) *Attorney, Agent, or Firm* — Cantor Colburn LLP

(57) ABSTRACT

A device is provided having a body. The body being made from a flexible material that has an electrical insulating property of at least 1000 volts. A first fastener is disposed on a first surface adjacent a first side. A second fastener is disposed on a second surface adjacent a second side, the second surface being opposite the first surface and the second side being opposite the first side. A plurality of straps is coupled to the body.

15 Claims, 5 Drawing Sheets

STRAY VOLTAGE INSULATING DEVICE

BACKGROUND OF THE INVENTION

The subject matter disclosed herein relates to an insulating wrap, and in particular to a wrap that may be used with structures electrically energized with stray voltage, such as street lamps or utility poles for example, to isolate the structure from inadvertent contact.

Objects may sometimes be energized with an electrical charge that has an elevated voltage potential, sometimes referred to as "stray voltage". Stray voltage may occur in a variety of situations, such as where insulation on an electrical conductor becomes worn or damaged. If the damaged conductor is in contact with a conductive structure, such as a pipe, a street light pole or a traffic control pole for example, then the structure may become energized with stray voltage.

In a number of jurisdictions and localities there is a requirement for utility companies to perform voltage testing to detect stray voltage. When an energized structure is found, the structure is isolated, such as with barricades for example, and the source of the voltage is investigated. Typically, service personnel will also be stationed at the structure to guard the structure and prevent third parties from touching the structure. It should be appreciated that in some circumstances the investigation to mitigate the stray voltage may take a considerable amount of time as source may not be readily apparent and the electrical energy may travel a distance from the location of the damaged conductor. In these cases, the company responsible for watching the energized structure may incur significant labor expense in stationing personnel to watch the structure.

Accordingly, while existing procedures for isolating an energized structure are suitable for their intended purposes the need for improvement remains, particularly in providing a device for isolating an energized structure and obviating the need for personnel to guard the structure.

BRIEF DESCRIPTION OF THE INVENTION

According to one aspect of the invention, a device is provided. The device includes a body made from a flexible material that has an electrical insulating property of at least 1000 volts. A first fastener is disposed on a first surface adjacent a first side. A second fastener is disposed on a second surface adjacent a second side, the second surface being opposite the first surface and the second side being opposite the first side. A plurality of straps is coupled to the body.

According to another aspect of the invention, another device is provided. The device includes a body having a substantially trapezoidal shape, the body being made from a flexible rubber material that has an electrical insulating property of at least 1000 volts. A first portion of a hook and loop fastener is arranged adjacent a first side. A second portion of the hook and loop fastener is arranged adjacent a second side, the second side being opposite the first side, wherein the first portion and second portion are arranged on opposing surfaces. A plurality of straps are coupled to the body adjacent the second side, each of the plurality of straps having a cargo snap-buckle.

According to yet another aspect of the invention, a method is provided. The method includes detecting a structure having stray voltage. A device is provided having a body having a substantially trapezoidal shape, the body being made from a flexible rubber material that has an electrical insulating property of at least 1000 volts. The device is wrapped around the structure. The device is secured to the structure with straps.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Stray voltage is an undesirable condition that occurs when insulation on an electrical conductor becomes damaged and electrical energy is transferred from the conductor to a surrounding structure. The stray voltage may travel into structures that are accessible to human contact. Embodiments of the present invention provide advantages in providing a device is quickly and easily deployed by field personnel to shield the structure having stray voltage to reduce the risk of shock due to inadvertent contact. Embodiments of the present invention provide further advantages in allowing the devices to be rapidly adapted to a variety of structural shapes. Embodiments of the present invention provide still further advantages in eliminating the need for a guard to watch the structure while the source of the stray voltage is being investigated. Term "stray voltage" as used herein is sometimes also referred to, and is synonymous with, the term "contact voltage" in some applications and localities (e.g. urban areas).

Figure 1:
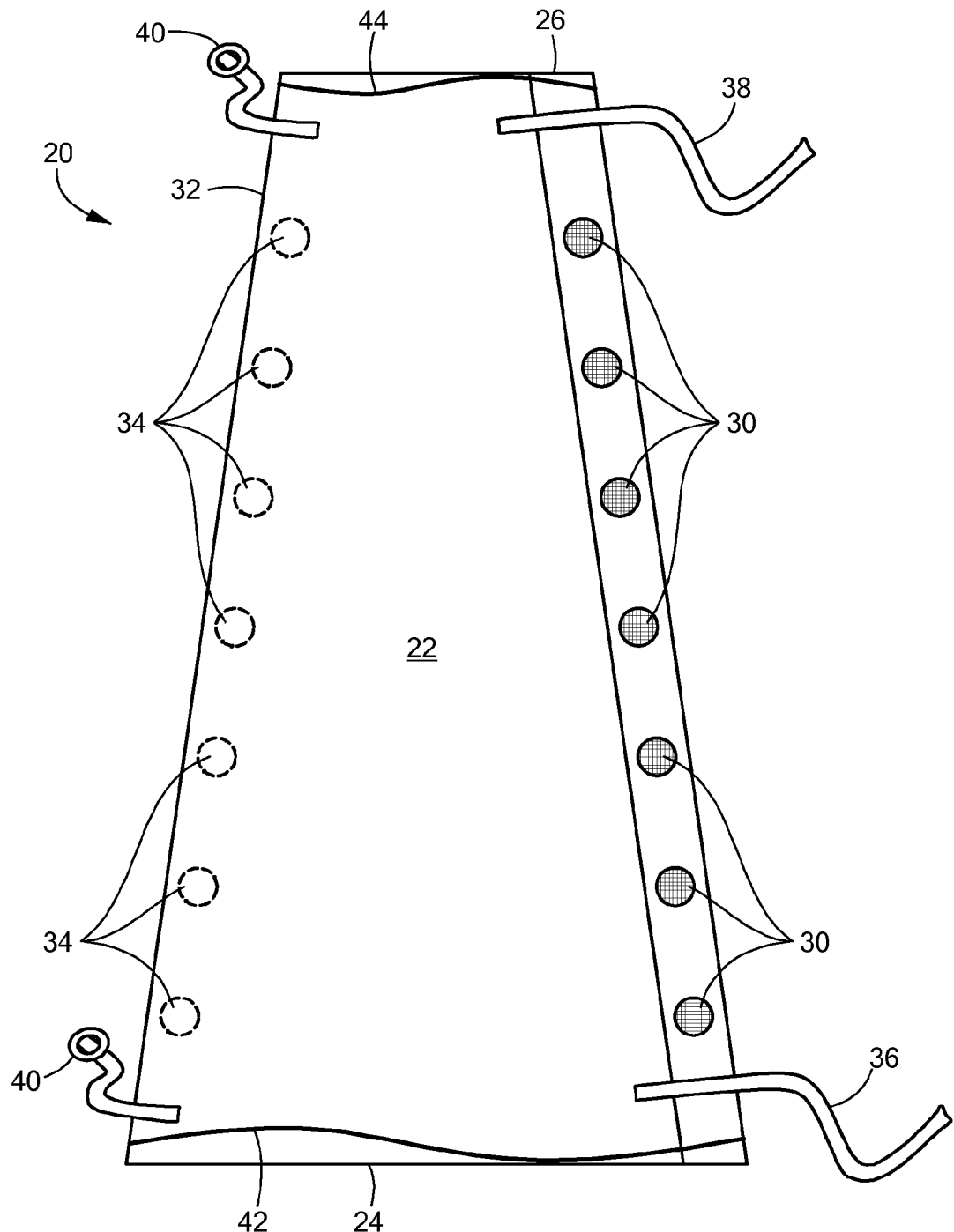
FIG. 1 is a side view of an insulating device in accordance with an embodiment of the invention.
Figure 2:
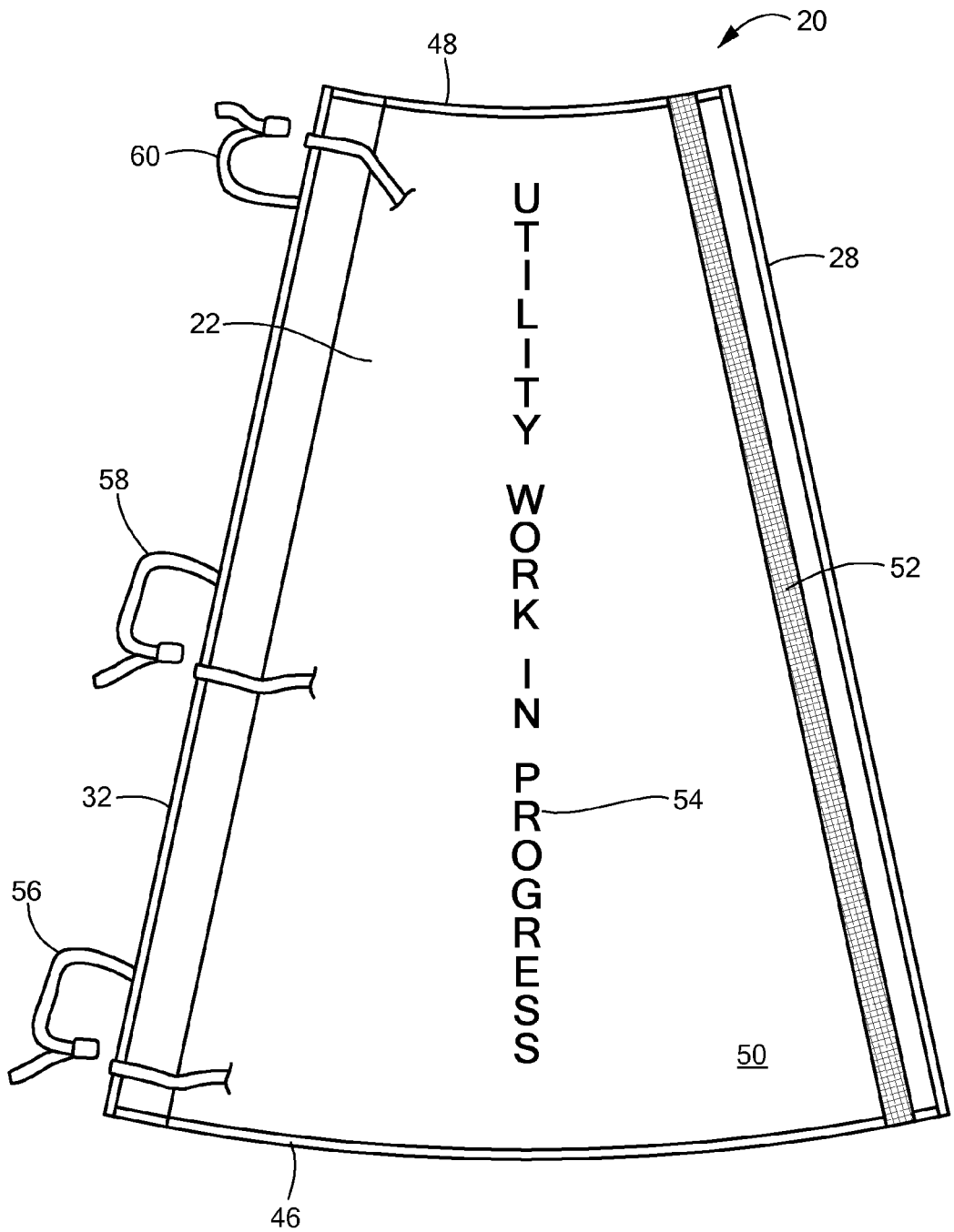
FIG. 2 is a side view of an outer portion of an insulating device in accordance with another embodiment of the invention.
Figure 3:
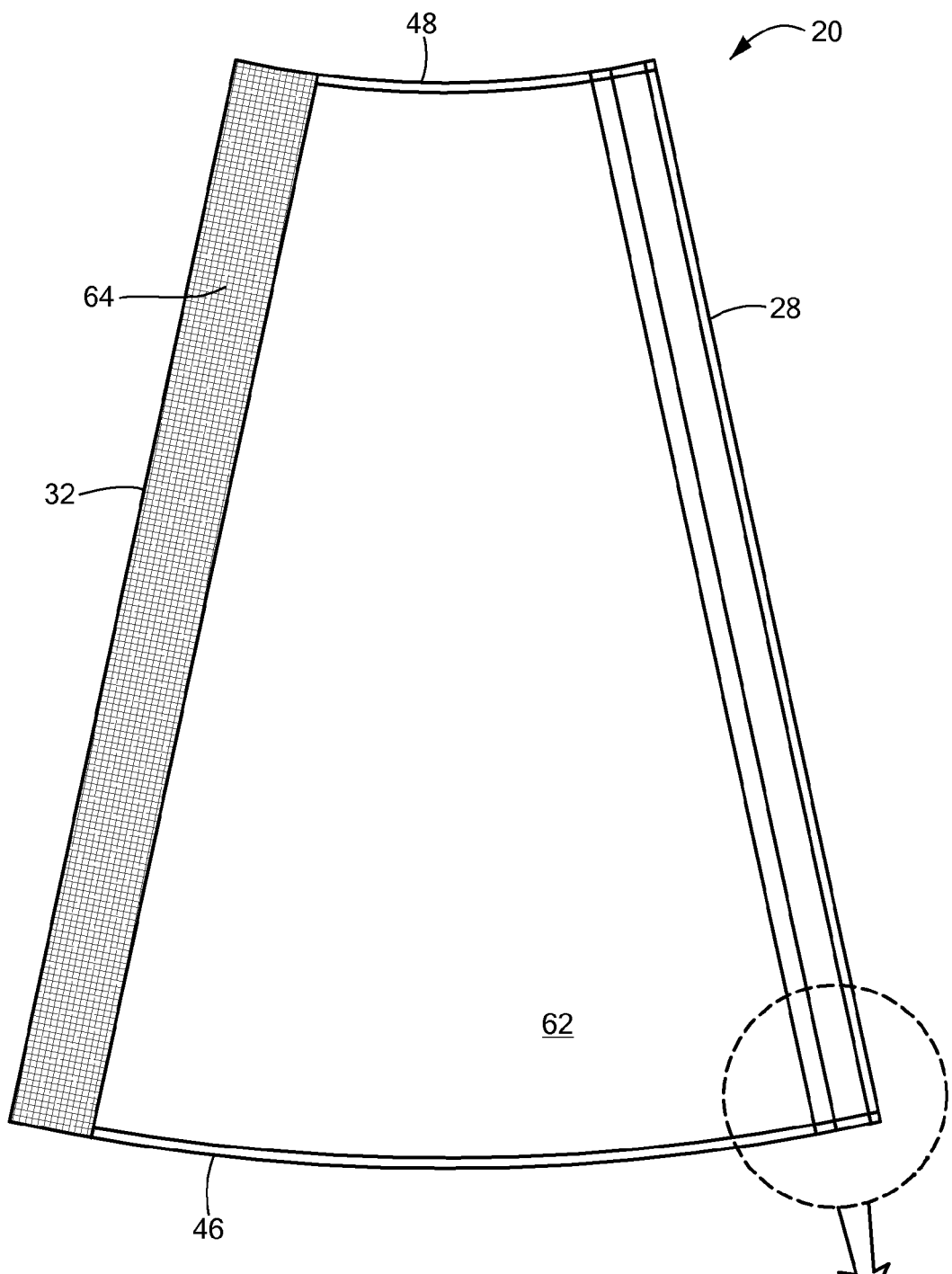
FIG. 3 is a side view on an inside portion of the insulating device of FIG. 2.
Figure 4:
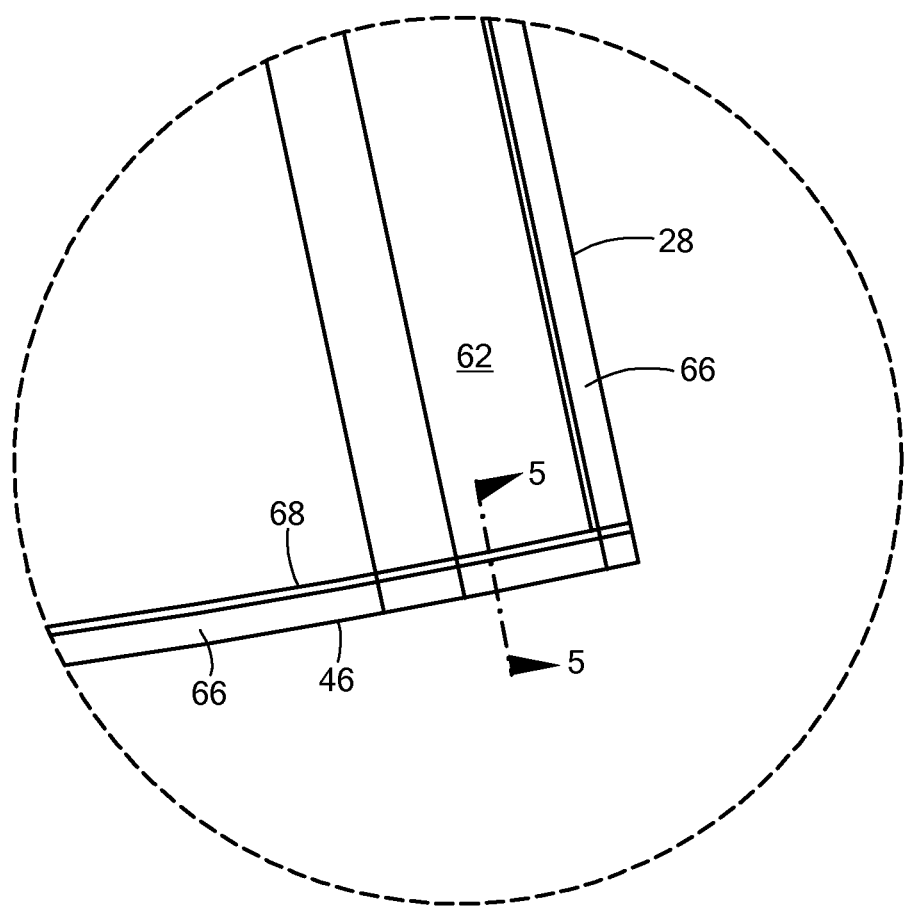
FIG. 4 is a partial detailed view of the inside portion of FIG. 3.

An exemplary device 20 is shown in FIG. 1 for shielding a structure, such as a light pole or a traffic light pole for example, which is energized with stray voltage. The device 20 includes a body 22 having substantially uniform thickness. The body 20 has a generally trapezoidal shape with a first end 24 being larger than a second end 26. In the exemplary embodiment, the first end 24 is 68 inches (1.73 meters) wide and the second end 26 is 32 inches (0.81 meters) wide. In the exemplary embodiment, the longitudinal sides are 84 inches to 90 inches (2.13-2.29 meters) long. The body 22 is made from a rubber sheeting material having a thickness between 0.030 inches to 0.040 inches (0.75-1.02 millimeters) and provides electrical insulation of at least 1000 volts AC. In one embodiment, the body is made from a material compliant with ASTM F2330-11 Class "0", type 2 for example.

Adjacent a first side 28 on an outer surface of the body 22, a first plurality of hook and loop type fasteners 30 are arranged along the length. Adjacent a second side 32 on an inner surface of the body 22, a second plurality of hook and loop type fasteners 34 are arranged to cooperate with the first plurality of hook and loop type fasteners 30 when the device 20 is wrapped around an object, such as a street light pole for example. In one embodiment, the first plurality of fasteners 30 is a hook portion of the fastener and the second plurality of fasteners 34 comprise the loop portion of the fastener. In one embodiment, a single hook and loop fastener strip is disposed along substantially the length of side 28 and a corresponding single hook and loop fastener strip is disposed along substantially the length of side 32.

The device 20 further includes a pair of straps 36, 38 that are coupled to the body 22. The straps 36, 38 may be made from a nylon type material and include a snap-lock buckle device 40 that allows the ends of the straps to be connected together. In one embodiment, the straps 36, 38 are adjustable to allow the device 20 to be tightened around the object it is wrapped. In the exemplary embodiment, the device 20 further includes a pair of elastic webbing members 42, 44. The elastic webbing members 42, 44 allow the device to fit tightly about the structure which it is wrapped.

Referring now to FIGS. 2-6, another embodiment of the device 20 is shown. In this embodiment, the device 20 includes a body 22 made from a flexible sheet material having a thickness between 0.030 inches to 0.040 inches (0.75-1.02 millimeters). The body 22 is made from a rubber sheeting material that is capable of providing electrical insulation up to 1000 volts AC. In one embodiment, the body 22 is made from a yellow-colored material compliant with ASTM F2330-11 Class "0", type 2 for example.

In this embodiment, the body 22 has a generally trapezoidal shape except with the ends 46, 48 being curved. On an outer surface 50 a hook and loop fastener 52 is disposed adjacent the side 28. In one embodiment, the fastener 52 is offset from the side 28 by 3 inches (0.76 meters) and the fastener 52 is 2 inches (0.51 meters) wide. The outer surface 50 may further include indicia 54 that provides a warning to persons near the device 20, or may also provide an identification of the person or company that installed the device. The device 20 may further include three straps 56, 58, 60 coupled to the device 20 adjacent the second side 32. In one embodiment, the strap 56 is 66 inches (1.68 meters) long, the strap 58 is 48 inches (1.23 meters) long and the strap 60 is 32 inches (0.81 meters) long. The straps 56, 58, 60 each include a plastic cargo snap-buckle and are adjustable to allow the device to be secured to the structure.

Figure 5:
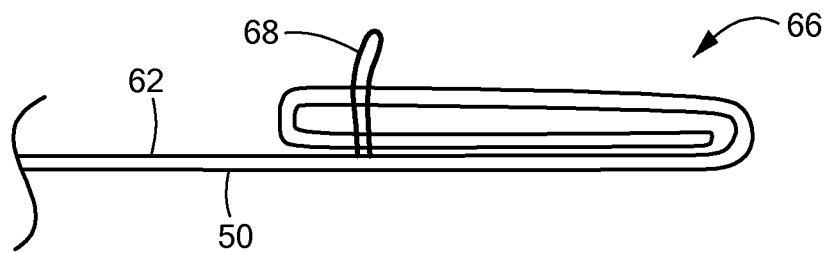
FIG. 5 is a partial sectional view of a hem portion of the insulating device of FIG. 2; and, FIG. 6 is a perspective view of the insulating device of FIG. 2 installed on a street pole.

Opposite the outer surface 50 is an inner surface 62. Disposed along the second side 32 on the inner surface 62 is a second hook and loop fastener 64. The fasteners 52, 64 are arranged to cooperate and removably engage each other to securely enclose the structure when installed. In one embodiment the fastener 64 is six inches (0.15 meters) wide. The ends 48, 48 and first side 28 each have a 0.5 inch (12.7 millimeter) wide hem portion 66. The hem portion 66 is doubled over and attached to the inner surface 62 (FIG. 5). In one embodiment, the hem portion 66 is secured with a threaded stitch 68.

Figure 6:
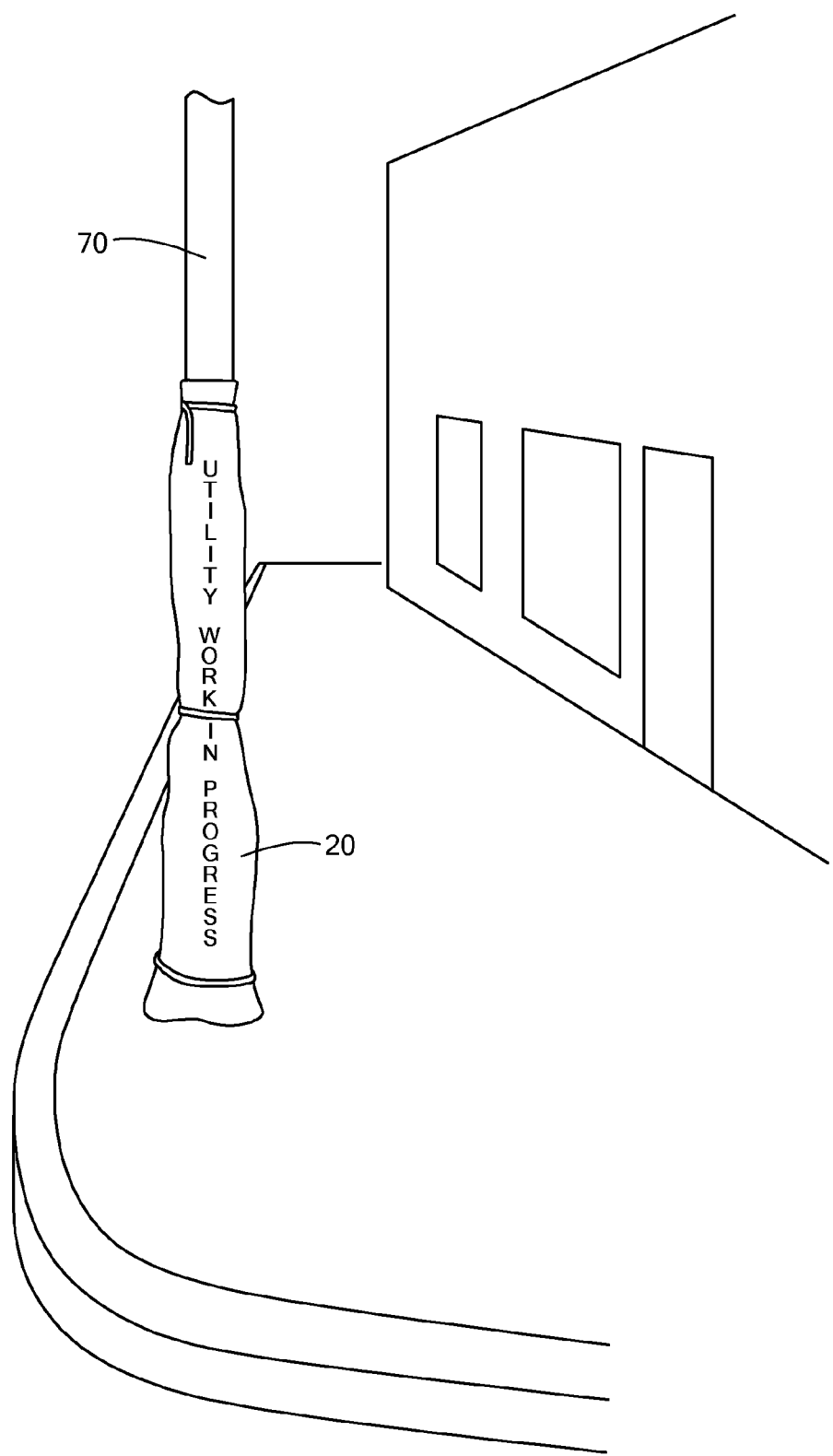

Referring now to FIG. 6, a device 20 is shown installed on a pole adjacent a street. As discussed above, periodic inspections for stray voltage are performed on structures 70 such as light poles or traffic light poles for example, that are in a location with pedestrian traffic may come into contact with the structure 70. When stray voltage is detected, the service personnel wrap the device 20 about the structure 70 and secure the sides 28, 32 with the hook and loop fasteners 52, 64. The straps 56, 58, 60 are than wrapped around the structure 70 to securely fasten the device 20 to the structure 70. By wrapping the device 20 about the structure 70, the exposed surfaces of the structure 70 are isolated from the surrounding pedestrian traffic and inadvertent contact may be avoided. Further, since the structure 70 is isolated, the need for a person to watch or guard the structure 70 may be obviated. It should be appreciated that the yellow color of the body 22 and the indicia 54 printed thereon provide further warnings to the passing pedestrian that they should avoid contact with the structure 70.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A device for isolating a structure having stray voltage, the device comprising:
   a body being made from a flexible rubber material that has an electrical insulating property of at least 1000 volts, the body sized to be wrapped around the structure to cover exposed surfaces of the structure to a predetermined height, the body having a curved first end and an opposing curved second end, a first side and an opposing second side extending linearly between the first end and the second end, wherein the second end has a larger arc length than the first end;
   a first fastener disposed on a first surface, the first fastener having an edge abutting and extending along the length of the first side;
   a second fastener disposed on a second surface, the second fastener having an edge offset from the second side, the second surface being opposite the first surface, the second fastener being configured to engage the first fastener, wherein the second side includes a hemmed portion along the first surface;
   a plurality of straps coupled to the body.

2. The device of claim 1 wherein the first fastener is a hook portion of a hook and loop fastener.

3. The device of claim 1 further comprising a first elastic member coupled to the first end of the body.

4. The device of claim 2 wherein the second fastener is a hook portion of a hook and loop fastener.

5. The device of claim 3 further comprising a second elastic member coupled to the second end of the body.

6. A device for isolating a structure having stray voltage, the device comprising:
   a body being made from a flexible rubber material that has an electrical insulating property of at least 1000 volts, the body sized to be wrapped around the structure to cover exposed surfaces of the structure to a predetermined height, the body having a curved first end and an opposing curved second end, a first side and an opposing second side extending linearly between the first end and the second end, wherein the second end has a larger arc length than the first end;
   a first portion of a hook and loop fastener disposed on a first surface, the first portion of a hook and loop fastener having an edge abutting and extending along the length of the first side;

a second portion of the hook and loop fastener disposed on a second surface and having an edge offset from the second side, the second side being opposite the first side, the second surface being opposite the first surface, wherein the second side includes a hemmed portion along the first surface; and, a plurality of straps coupled to the body adjacent the second side, each of the plurality of straps having a cargo snap-buckle.

7. The device of claim 6 further comprising a first elastic member coupled to the first end and a second elastic member coupled to the second end.

8. The device of claim 6 wherein the body has a thickness between 0.030 inches to 0.040 inches.

9. The device of claim 8 wherein the body is 84-90 inches long, the first end is 26-32 inches wide, and the second end is 24-68 inches wide.

10. A method comprising:

detecting a structure having stray voltage;

providing a device having a body, the body being made from a flexible rubber material that has an electrical insulating property of at least 1000 volts, the body sized to be wrapped around the structure to cover exposed surfaces to a predetermined height, the body having a curved first end and an opposing curved second end, a first side and an opposing second side extending linearly between the first end and the second end, wherein the second end has a larger arc length than the first end;

providing a first portion of a hook and loop fastener disposed on a first surface, the first portion of a hook and loop fastener having an edge abutting and extending along the length of the first side;

providing a second portion of the hook and loop fastener disposed on a second surface and having an edge offset from the second side, the second side being opposite the first side, the second surface being opposite the first surface, wherein the second side includes a hemmed portion along the first surface;

wrapping the device around the structure to substantially cover the exposed surfaces of the structure; and, securing the device to the structure with straps.

11. The method of claim 10 further comprising removably coupling a first side of the device to a second side of the device when wrapping the device around the structure.

12. The method of claim 11 further comprising providing a warning indicia on a surface of the device and arranging the device when wrapping the structure such that the warning indicia is viewable.

13. The method of claim 12 wherein the first side of the device is removably coupled to the second side of the device with the first portion and second portion of the hook and loop fastener.

14. The method of claim 13 wherein the body is substantially trapezoidal in shape.

15. The method of claim 14 further comprising providing a first elastic member coupled to one end of the body and a second elastic member coupled to an opposite side of the body.

* * * * *